United States Patent
Kawagishi et al.

(10) Patent No.: US 8,036,610 B2
(45) Date of Patent: Oct. 11, 2011

(54) WIRELESS TERMINAL AND LEVEL MEASUREMENT METHOD

(75) Inventors: Takeshi Kawagishi, Kawasaki (JP); Tsutomu Itou, Kawasaki (JP); Yuki Idogawa, Yokohama (JP); Masayuki Muranaka, Mitaka (JP); Atsushi Manabe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 12/320,104

(22) Filed: Jan. 16, 2009

(65) Prior Publication Data

US 2009/0131005 A1 May 21, 2009

Related U.S. Application Data

(63) Continuation of application No. PCT/JP2006/314561, filed on Jul. 24, 2006.

(51) Int. Cl.
*H04B 1/06* (2006.01)
*H04B 17/00* (2006.01)

(52) U.S. Cl. ............ 455/101; 455/226.2; 455/501; 455/115.1; 455/161.3; 455/277.2

(58) Field of Classification Search .......... 455/101, 455/450, 452.1, 13.3, 500–501, 513, 63.1, 455/63.3, 67.11, 67.13, 562.1, 114.2, 115.3, 455/115.4, 132, 134–135, 161.1, 161.3, 186.1, 455/226.1, 226.2, 226.4, 230, 277.2, 269, 455/278.1, 284, 295

See application file for complete search history.

(56) References Cited

U.S. PATENT DOCUMENTS

| | | | | |
|---|---|---|---|---|
| 6,088,407 | A | * | 7/2000 | Buternowsky et al. ........ 375/347 |
| 7,076,227 | B1 | * | 7/2006 | Smith ......................... 455/278.1 |
| 7,366,139 | B2 | * | 4/2008 | Poegel et al. ................. 370/334 |
| 7,369,832 | B2 | | 5/2008 | Cho |
| 7,746,948 | B2 | * | 6/2010 | Izumi ............................. 375/267 |
| 7,756,483 | B2 | * | 7/2010 | Chang et al. ............... 455/67.13 |
| 7,782,987 | B2 | * | 8/2010 | Jonsson ........................ 375/348 |
| 2002/0193146 | A1 | * | 12/2002 | Wallace et al. ............... 455/562 |
| 2005/0032497 | A1 | * | 2/2005 | Girardeau et al. ............ 455/272 |
| 2006/0034349 | A1 | | 2/2006 | Muranaka et al. |
| 2009/0111542 | A1 | * | 4/2009 | Luschi et al. .............. 455/575.7 |
| 2010/0246725 | A1 | * | 9/2010 | Okuyama et al. ............. 375/340 |

FOREIGN PATENT DOCUMENTS

| | | |
|---|---|---|
| JP | H04-337931 A | 11/1992 |
| JP | H10-261985 A | 9/1998 |
| JP | 2001-186070 | 7/2001 |
| JP | 2002-171210 A | 6/2002 |
| JP | 2004-343757 | 12/2004 |
| JP | 2005-268849 A | 9/2005 |
| JP | 2006-54816 | 2/2006 |

OTHER PUBLICATIONS

International Search Report in PCT/JP2006/314561 dated Oct. 24, 2006.

\* cited by examiner

*Primary Examiner* — Pablo Tran
(74) *Attorney, Agent, or Firm* — Murphy & King, P.C.

(57) ABSTRACT

A wireless terminal using switchable first and second reception antennas to perform diversity reception of data transmitted from a base station is proposed. The terminal includes an average value calculation unit that calculates an average value of a reception level measurement result of the first reception antenna and a reception level measurement result of the second reception antenna; and a correction unit that corrects the average value calculated on the basis of a predetermined thermal noise level, a received RSSI value measurement result of the first reception antenna, and a received RSSI value measurement result of the second reception antenna.

5 Claims, 6 Drawing Sheets

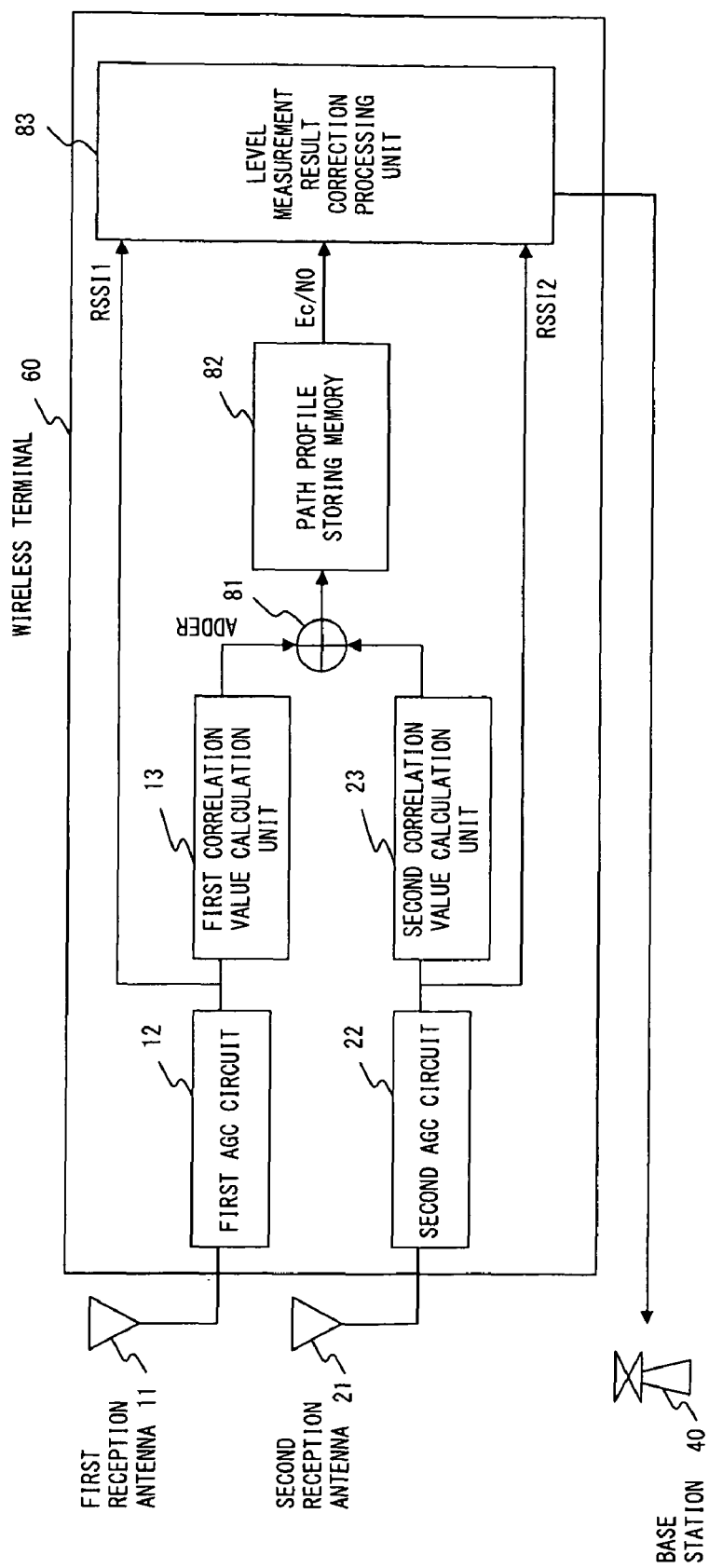
F I G. 2

| OUTPUT Ec/N0(dB) | OUTPUT RSSI1(dBm) | OUTPUT RSSI2(dBm) | CORRECTED Ec/N0(dB) |
|---|---|---|---|
| -10.00 | -60.00 | -60.00 | -5.00 |
| -5.93 | -97.88 | -60.00 | -5.00 |
| -7.45 | -101.36 | -60.00 | -5.00 |
| -7.94 | -101.93 | -60.00 | -5.00 |
| -5.13 | -60.00 | -89.73 | -5.00 |
| -5.93 | -60.00 | -97.88 | -5.00 |
| -7.45 | -60.00 | -101.36 | -5.00 |
| -7.94 | -60.00 | -101.93 | -5.00 |
| -6.13 | -89.73 | -60.00 | -6.00 |
| -6.93 | -97.88 | -60.00 | -6.00 |
| -8.45 | -101.36 | -60.00 | -6.00 |
| -8.94 | -101.93 | -60.00 | -6.00 |
| ⋮ | | | |
| -7.13 | -89.73 | -60.00 | -7.00 |
| -7.93 | -97.88 | -60.00 | -7.00 |
| ⋮ | | | |
| -10.13 | -89.73 | -60.00 | -10.00 |
| -10.93 | -97.88 | -60.00 | -10.00 |
| ⋮ | | | |
| -20.13 | -89.73 | -60.00 | -20.00 |
| -20.93 | -97.88 | -60.00 | -20.00 |
| ⋮ | | | |
| -30.13 | -89.73 | -60.00 | -30.00 |
| -30.93 | -97.88 | -60.00 | -30.00 |

FIG.6

WIRELESS TERMINAL AND LEVEL MEASUREMENT METHOD

CROSS REFERENCE TO RELATED APPLICATION

This application is a continuation of PCT application of PCT/JP2006/314561, which was filed on Jul. 24, 2006

BACKGROUND OF THE INVENTION

1. Field of the Invention

The present invention relates to a wireless terminal. The wireless terminal may perform diversity reception using two switchable antenna systems. The present invention also relates to a level measurement method used in such a mobile terminal.

2. Description of the Related Art

In conventional mobile communications systems, reception performance can be degraded due to fading caused by the interference of multiple waves. In order to reduce the influence of fading, mobile terminals in the conventional mobile communication systems utilize a plurality of antenna branches that are independent in view of space, polarization, angle, frequency, or time.

FIG. 1 shows a configuration example of a wireless terminal having a conventional diversity reception function.

In FIG. 1, a wireless terminal 10 such as a mobile phone or the like includes a first reception antenna 11, a first AGC (Auto Gain Control) circuit 12, a first correlation value calculation unit 13, a first path profile storing memory 14, a second reception antenna 21, a second AGC circuit 22, a second correlation value calculation unit 23, a second path profile storing memory 24, and a level measurement result selection/removal processing unit 31.

The first reception antenna 11 and the second reception antenna 21 transmit and receive communication signals between the wireless terminal 10 and a base station 40.

The first AGC circuit 12 amplifies a signal received through the first reception antenna 11 to a certain level. The second AGC circuit 22 also amplifies a signal received through the second reception antenna 21 to a certain level. The first correlation value calculation unit 13 obtains a correlation value of the inverse-spread code and the signal that was received through the first reception antenna 11 and amplified by the first AGC circuit. The second correlation value calculation unit 23 obtains a correlation value of the inverse-spread code and the signal that was received through the second reception antenna 21 and amplified by the second AGC circuit. The first path profile storing memory 14 stores, as a path profile, an Ec/NO value (Ec/NO1) calculated by the first correlation value calculation unit 13. The second path profile storing memory 24 stores, as a path profile, an Ec/NO value (Ec/NO2) calculated by the second correlation value calculation unit 23.

The level measurement result selection/removal processing unit 31 compares the Ec/NO1 stored in the first path profile storing memory and the Ec/NO2 stored in the second path profile storing memory in order to select the higher value and discard the lower value. Then, the level measurement result selection/removal processing unit 31 reports the selected value i.e. the higher value to the basement station 40.

In other words, the wireless terminal 10 measures levels respectively in the first reception antenna 11 and the second reception antenna 21, and adopts the highest level measurement value in order to report this value to the base station 40 while discarding the other level measurement value (as disclosed in, for example, Japanese Patent Application Publication No. 2002-171210).

However, the above conventional technique involves a problem whereby the effect of diversity reception cannot be fully utilized because only the maximum level measurement value is reported to the base station and the other level measurement value is discarded.

Also, conventional wireless terminals such as mobile phones or the like have to obtain correlation power for the received signals and to store many values obtained by integrating the obtained results so as to correspond to the width of the path window. This requires an immense amount of memory and storing of the integration result for each of the reception antennas, leading to larger circuit sizes, which is problematic.

SUMMARY OF THE INVENTION

A wireless terminal performs diversity reception of data transmitted from a base station using switchable first and second reception antennas. The wireless terminal has a first level measurement unit for measuring a reception level of the first reception antenna; a second level measurement unit for measuring a reception level of the second reception antenna; an average value calculation unit configured to calculate an average value of a first level measurement result measured by the first level measurement unit and a second level measurement result obtained by the second level measurement unit; a first RSSI measurement unit for measuring an RSSI value received through the first reception antenna; a second RSSI measurement unit for measuring an RSSI value received through the second reception antenna; and a correction unit configured to correct the average value calculated by the average value calculation unit, said correction being performed on the basis of a predetermined thermal noise level, a first RSSI value measurement result obtained by the first RSSI measurement unit, and a second RSSI value measurement result measured by the second RSSI measurement unit.

BRIEF DESCRIPTION OF THE DRAWINGS

FIG. 2 shows a configuration example of a wireless terminal;

FIG. 6 shows a table containing correction values.

DESCRIPTION OF THE PREFERRED EMBODIMENT

Figure 1:
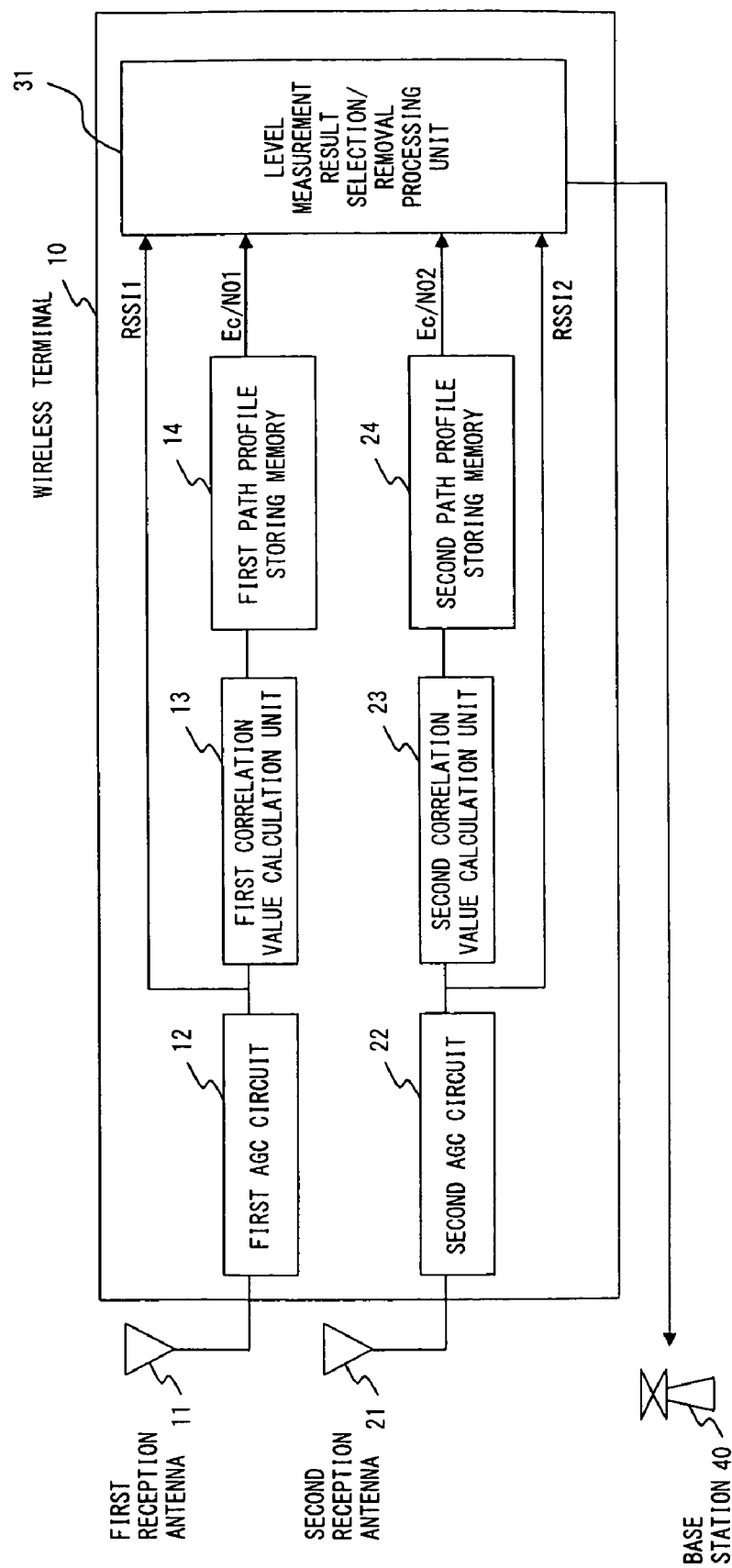
FIG. 1 shows a configuration example of a wireless terminal having a conventional diversity reception function.

Hereinafter, embodiments of the present invention will be explained by referring to the drawings.

The embodiment enables accurate reporting of a level measurement result to a base station in the vicinity of thermal noise by employing a power profile of a path search in a mobile terminal such as a W-CDMA compatible mobile phone or the like having a diversity reception function.

In the embodiment below, a mobile terminal obtains an average value of the level measurement results respectively for a plurality of reception antennas, and stores the value in a single memory. Then, for the purpose of suppressing the lowering of level measurement values caused by the thermal noise of each reception antenna when averaging, a correction process is performed in order to remove the influence of the thermal noise from the averaged level measurement result. This correction is performed by utilizing the fact that the thermal noise level is known and that an RSSI (Received Signal Strength Indicator) value is fixed for each of the reception antennas. Further, because there is a probability that the calculation performed for this correction will increase the calculation amount so as to consume greater power, correction values are held in the form of a table so that the level measurement results corrected according to this table are reported to the base station.

FIG. 2 shows a configuration of a wireless terminal of the embodiment.

In FIG. 2, a wireless terminal 60 such as a mobile phone or the like includes the first reception antenna 11, the second reception antenna 21, the first AGC circuit 12, the second AGC circuit 22, the first correlation value calculation unit 13, and the second correlation value calculation unit 23, as are included in the conventional wireless terminal 10, and further includes an adder 81 that the conventional wireless terminal 10 does not comprise.

The wireless terminal 60 has a path profile storing memory 82 instead of the first path profile storing memory 14 and the second path profile storing memory 24 included in the conventional wireless terminal 10. The wireless terminal 60 does not have the level measurement result selection/removal processing unit 31 that the conventional wireless terminal 10 includes, but has a level measurement result correction processing unit 83.

The adder 81 obtains an average value of the path search correlation powers, and transfers this average value to the path profile storing memory 82. The above correlation powers are obtained respectively by the first correlative value calculation unit 13 and the second correlative value calculation unit 23 for the signals that were received through the first reception antenna 11 and the second reception antenna 21, respectively, and that were amplified by the first AGC circuit 12 and the second AGC circuit 22, respectively.

Then, the level measurement result correction processing unit 83 performs a correction process. The content of the correction process is as follows: The level measurement result correction processing unit 83 uses the path search correlation power averaged by the adder 81 as a level measurement result of the wireless terminal 60 in a range not influenced by the thermal noise. However, in order to suppress the lowering of the average value caused by the reduction of each path search correlation power value, the level measurement result correction processing unit 83 subtracts the known thermal noise level from an RSSI value (RSSI1) obtained by the first reception antenna 11 and from another RSSI value (RSSI2) obtained from the second reception antenna 21, and compares the result with an ideal RSSI value (in other words, and RSSI value not influenced by the thermal noise). The averaged level measurement result is corrected on the basis of the comparison result, and thereby a level measurement result that is not influenced by the thermal noise is calculated.

The above correction process is performed by firmware, thus not leading to an increase in the number of circuits.

Figure 3:
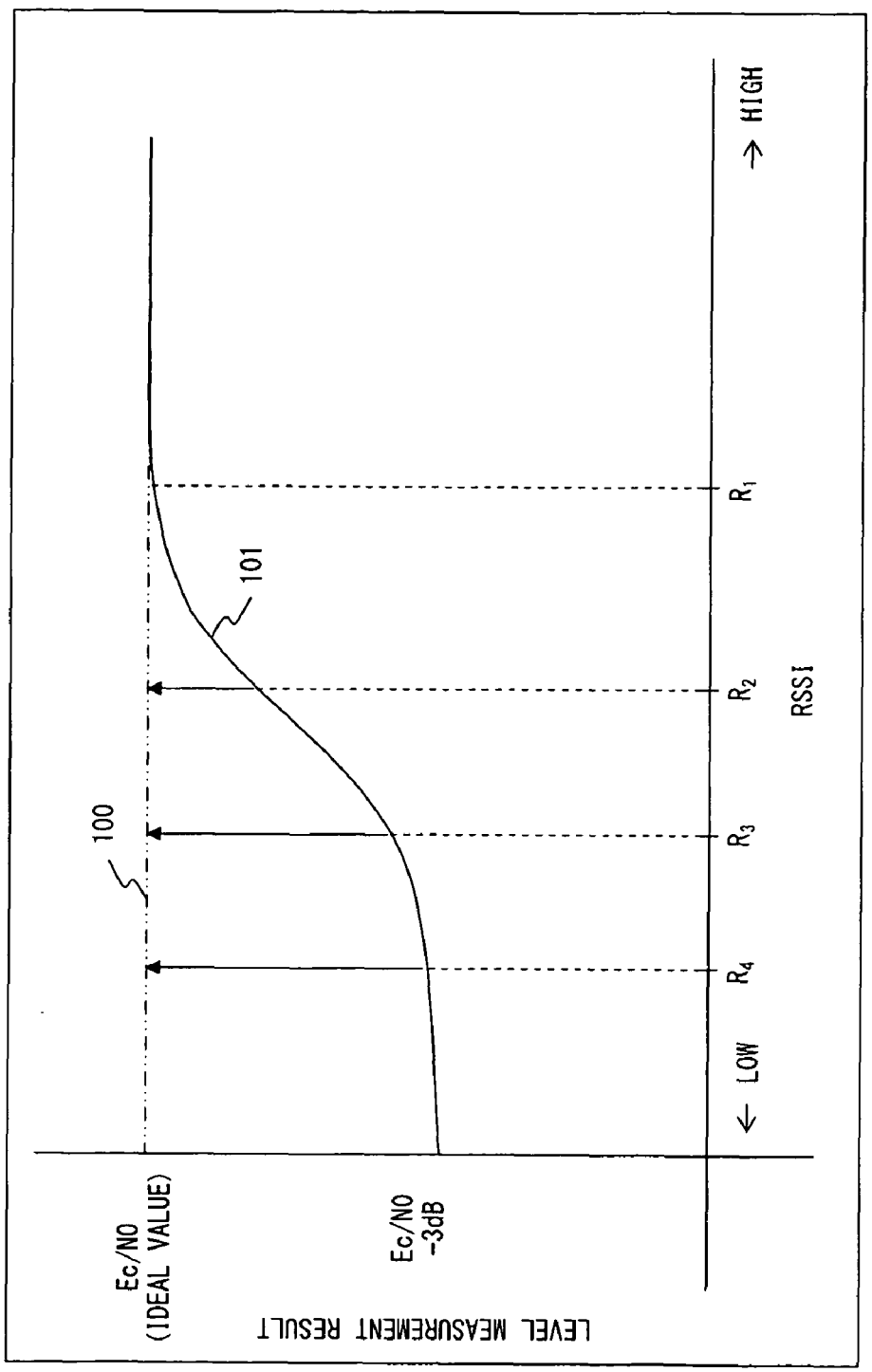
FIG. 3 shows an example of a specific correction of a level measurement result.

FIG. 3 shows an example of a specific correction of a level measurement result.

In FIG. 3, the dashed double-dotted line 100 represents the ideal Ec/NO values, and the solid line 101 represents averaged Ec/NO values.

The two lines are approximately identical to each other in the area where they are not influenced by the thermal noise, i.e., where RSSI values are greater than R1, and accordingly a correction is not required. However, in the area where RSSI values are smaller than R1, where the thermal noise starts being an influence, e.g., the areas around R2, R3, and R4, the Ec/NO values are made to be lower when being averaged (lower by 3 dB at maximum). Accordingly, when corrected, the solid line 101 can get closer to the dashed double-dotted line 100.

As shown in FIG. 3, by performing the correction process by the level measurement result correction processing unit 83, for example, when the RSSI value of either the first reception antenna 11 or the second reception antenna 21 is extremely bad, and when level measurement results involve errors, correction can still be performed so that ideal level measurement results can be obtained.

As described above, in the area where neither the first reception antenna 11 nor the second reception antenna 21 is influenced by the thermal noise, the best measurement result obtained by averaging the level measurement results of both the first reception antenna 11 and the second reception antenna 21 can be reported. Further, even when the reception level of one of the first reception antenna 11 and the second reception antenna 21 is extremely low, an accurate measurement result can be reported. Also, the level measurement result to be stored is only for either the first reception antenna 11 or the second reception antenna 21, leading to a reduction in the number of circuits.

Next, a specific method for obtaining a correction method by using equations will be explained.

First, the respective RSSI values and the Ec/NO values are defined as follows, where all the values are true values.

RSSI1: (RSSI value measured by the first reception antenna 11)

RSSI2: (RSSI value measured by the second reception antenna 21)

RSSI1': (value obtained when thermal noise is added to RSSI1)

RSSI2': (value obtained when thermal noise is added to RSSI2)

(Ec/NO) noise: (averaged value of the Ec/NO values of the first and second reception antennas 11 and 21 (influenced by thermal noise))

Nt: (thermal noise determined by temperature and characteristics of the wireless terminal)

When an Ec/NO value gets close to Nt, the Ec/NO value is corrected as described below.

(1) Ec/NO values in an area where thermal noise is an influence are obtained as results of the path search of each antenna by the equations below, where an Ec/NO value that is not influenced by the thermal noise is denoted as (Ec/NO) org.

$$Ec/N01 = (Ec/N01)_{org} \times \frac{RSSI1}{RSSI1'} \quad \text{[Equation 1]}$$

(a level measured by the first reception antenna 11)

$$Ec/N02 = (Ec/N02)_{org} \times \frac{RSSI2}{RSSI2'} \quad \text{[Equation 2]}$$

(a level measured by the second reception antenna 21)

(2) In the above equations, RSSI1 and RSSI2 are determined as follows:

RSSI1=RSSI1'−Nt (RSSI value measured by the first reception antenna 11)

RSSI2=RSSI2'−Nt (RSSI value measured by the second reception antenna 21)

(3) (Ec/N01) org and (E/N02) org represent level measurement results from which the influence of thermal noise has been removed. They are the same values, and accordingly the following equation is satisfied.

$$(Ec/N01)_{org}=(Ec/N02)_{org}=(Ec/N0)_{org} \quad \text{[Equation 3]}$$

(4) Then, $(Ec/N0)_{noise}$ to be output is expressed in the following expression.

$$(Ec/N0)_{noise} = (Ec/N01 + Ec/N02) \div 2 = \quad \text{[Equation 4]}$$
$$(Ec/N0)_{org} \times \left(\frac{RSSI1}{RSSI1'} + \frac{RSSI2}{RSSI2'}\right) \div 2$$

Accordingly, the ideal (Ec/NO) org when there is no influence by thermal noise is expressed as the following expression.

$$(Ec/N0)_{org} = \quad \text{[Expression 5]}$$
$$(Ec/N0)_{noise} \times \frac{2}{\left(\frac{RSSI1' - Nt}{RSSI1'} + \frac{RSSI2' - Nt}{RSSI2'}\right)}$$

(5) From the above, a value that has been corrected in accordance with $(Ec/NO)_{noise}$ obtained from a level measurement result can be obtained.

(6) The thermal noise level can be determined for each wireless terminal, and the above equation for a correction is stored in the wireless terminal 60 in the form of a table.

Figure 4:
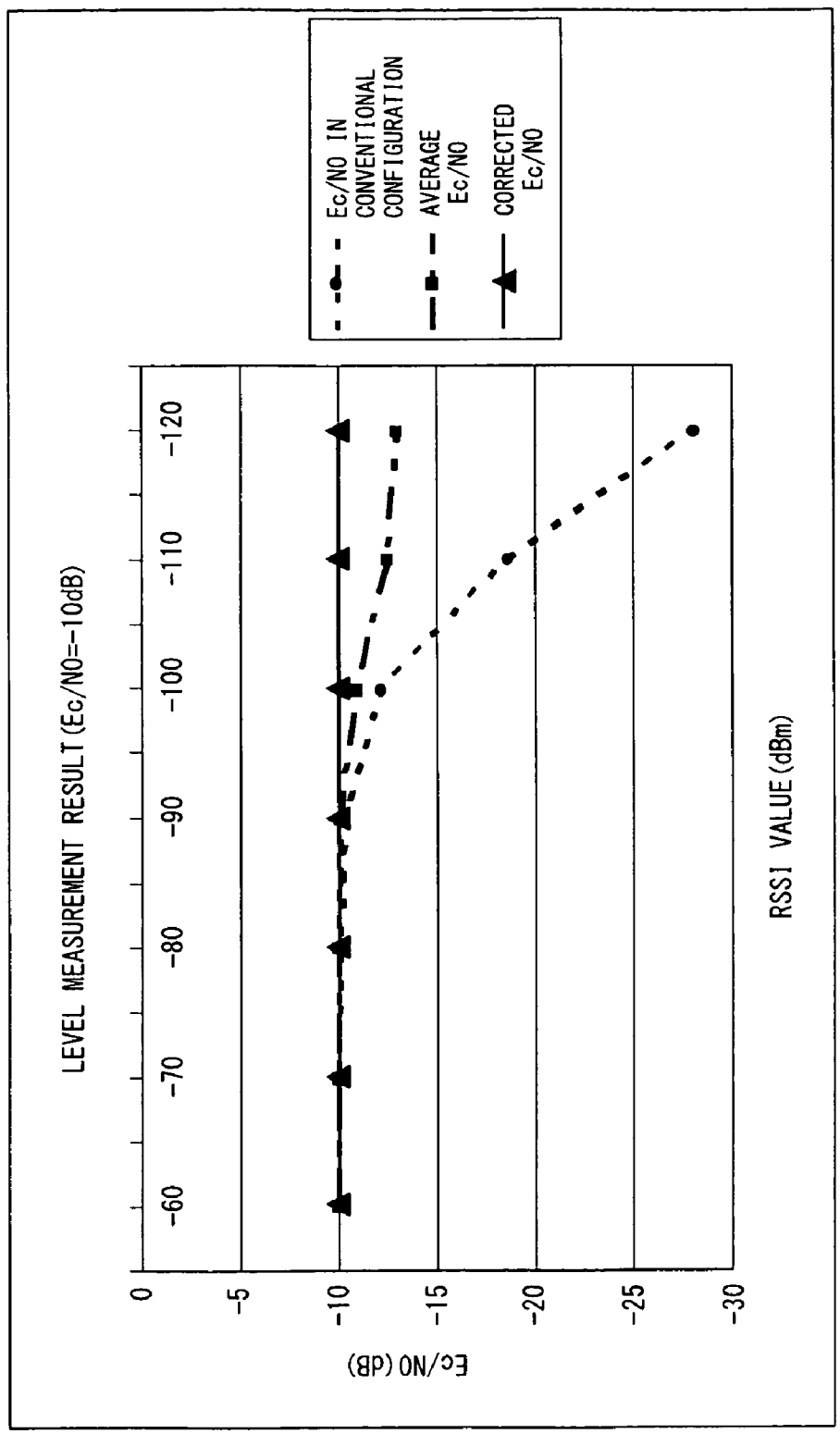
FIG. 4 is a graph showing an example of applying specific equations to the graph shown in FIG. 3.

FIG. 4 is a graph showing the results of the corrections performed on the basis of the above correction equations.

As a measurement condition for the graph shown in FIG. 4, one of the RSSI values of the first and second reception antennas 11 and 21 is fixed (to −60 dBm), and the other RSSI value is decreased gradually so that changes in an Ec/NO value are output. An Ec/NO value from the base station 40 is fixed to −10 dB. The thermal noise level is −102 dBm.

The dashed line in FIG. 4 represents results obtained when the Ec/NO values of the first and second reception antennas 11 and 21 of a conventional technique are output separately. The dash-dot line represents Ec/NO values averaged in order to reduce the memory amount being used according to the present embodiment. The solid line represents values obtained by applying the correction value of the above correction equations to the averaged Ec/NO values.

As shown in FIG. 4, the averaged Ec/NO value falls below the inherent level measurement result (−10 dB) as the input level of one of the two reception antennas goes down, and this averaged value can be corrected by using the above correction equations. Also, FIG. 4 shows that the Ec/NO values of one of the reception antennas represented by the dashed line falls drastically as the RSSI values goes down because the Ec/NO values are not averaged. In such a case, the Ec/NO value of the reception antenna having the higher RSSI value is reported to the base station 40. However, when, for example, the RSSI values of both of the two reception antennas are about −90 dBm in this graph, an accurate level measurement result cannot be reported.

Figure 5:
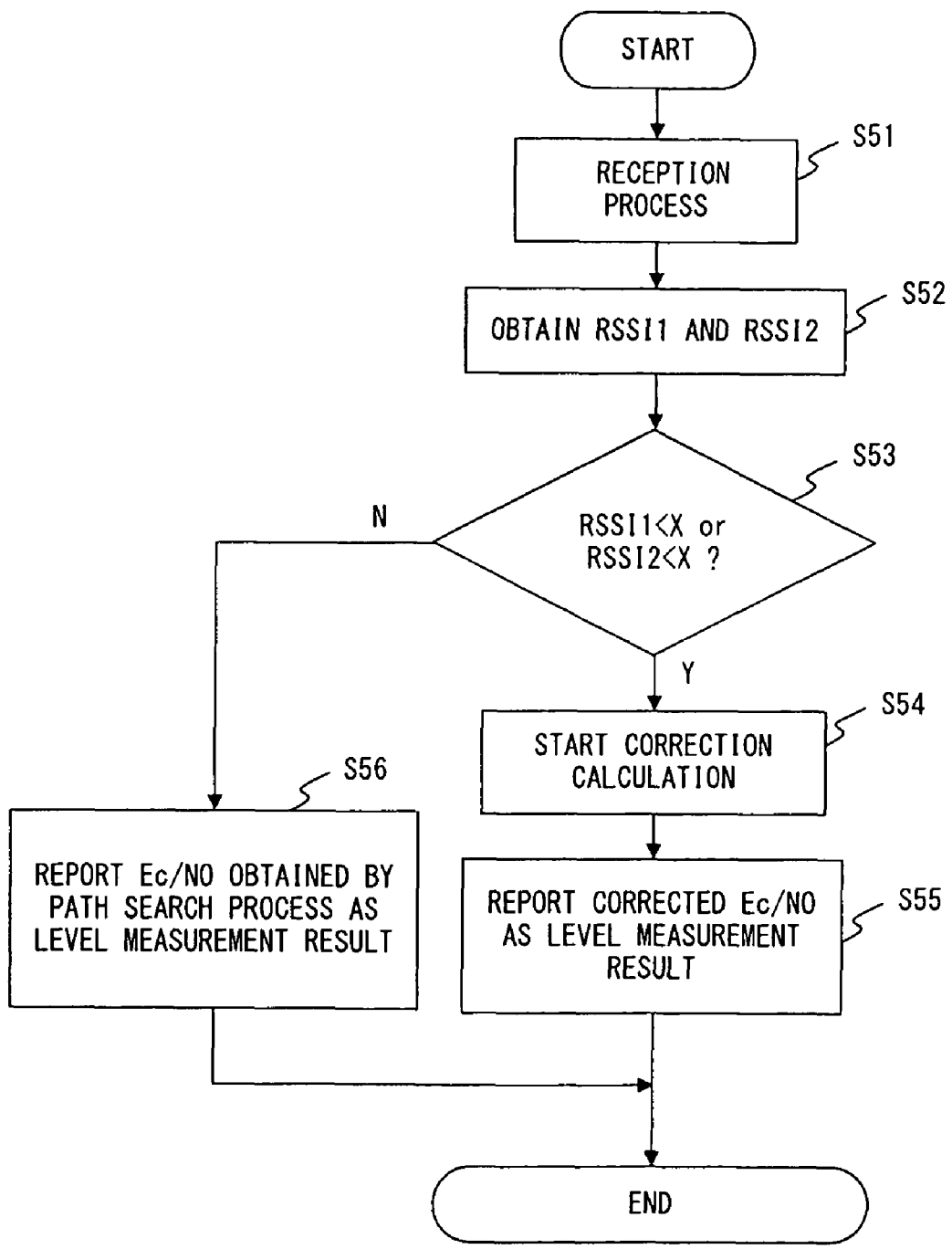
FIG. 5 is a flowchart showing the flow of a level measurement process.

FIG. 5 is a flowchart showing a flow of a level measurement process.

When a reception process is started in step S51, RSS1 and RSSI2 obtained after AGC are obtained in S52.

In step S53, it is determined whether or not RSSI1 or RSSI2 is smaller than a prescribed value X, which is a value at which thermal noise starts being an influence. The prescribed value X is beforehand determined on the basis of a simulation, and is stored in the wireless terminal 60 as a non-volatile value.

When RSSI1 or RSSI2 is smaller than the prescribed value X (Y in step S53), the above correction calculations are performed in step S54. Thereafter, the correction result obtained in step S54 is reported to the base station 40 as a level measurement result.

When neither RSSI1 nor RSSI2 is smaller than the prescribed value X, in other words when both RSSI1 and RSSI2 are greater than the prescribed value X (N in step S53), the Ec/NO value obtained through a path search process is reported to the base station 40 as the level measurement result in step S56.

Also, when an increase in processing amount caused by using firmware for obtaining the correction values from the above equations (1) through (5) is expected, correction values in the form of a table are stored in the wireless terminal 60 by using the respective Ec/NO values (output Ec/NO values and corrected Ec/NO values) and the respective RSSI values (output RSSI1 and output RSSI2) as shown in FIG. 6. Thereby, the calculation loads are reduced. In FIG. 6, the correction values are calculated assuming that the thermal noise level is 102 dBm.

Hereinabove, embodiments of the present invention has been described by referring to the drawings. However, the scope of the present invention is not limited to the above embodiments, and various configurations or shapes can be allowed without departing from the spirit of the present invention.

According to the present invention, the amount of memory can be reduced without degrading the communication levels, and thereby it is possible to provide a wireless terminal that operates with a smaller scale of circuits and reduced electricity consumption and cost, and to provide a level measurement method executed in such a wireless terminal.

What is claimed is:

1. A wireless terminal using switchable first and second reception antennas to perform diversity reception of data transmitted from a base station, comprising:
   a first level measurement unit for measuring a reception level of the first reception antenna;
   a second level measurement unit for measuring a reception level of the second reception antenna;
   an average value calculation unit configured to calculate an average value of a first level measurement result measured by the first level measurement unit and a second level measurement result obtained by the second level measurement unit;
   a first RSSI measurement unit for measuring an RSSI value received through the first reception antenna;
   a second RSSI measurement unit for measuring an RSSI value received through the second reception antenna; and
   a correction unit configured to correct the average value calculated by the average value calculation unit, said correction being performed on the basis of a predetermined thermal noise level, a first RSSI value measurement result obtained by the first RSSI measurement unit, and a second RSSI value measurement result measured by the second RSSI measurement unit.

2. The wireless terminal according to claim 1, further comprising:
   a table unit for storing the first level measurement result, the second level measurement result, the first RSSI value measurement result, and the second RSSI value measurement result, wherein:
   the correction unit corrects the average value on the basis of the thermal noise level, and on the basis of the first level measurement result, the second level measurement result, the first RSSI value measurement result, and the second RSSI value measurement result stored in the table unit.

3. The wireless terminal according to claim 1, further comprising:
   a transmission unit for transmitting a correction level corrected by the correction unit to the base station.

4. The wireless terminal according to claim 3, further comprising:
   a table unit for storing the first level measurement result, the second level measurement result, the first RSSI value measurement result, and the second RSSI value measurement result, wherein:
   the correction unit corrects the average value on the basis of the thermal noise level, and on the basis of the first level measurement result, the second level measurement result, the first RSSI value measurement result, and the second RSSI value measurement result stored in the table unit.

5. A level measurement method executed in a wireless terminal using switchable first and second reception antennas to perform diversity reception of data transmitted from a base station, comprising:
   a step in which a first level measurement unit measures a reception level of the first reception antenna;
   a step in which a second level measurement unit measures a reception level of the second reception antenna;
   a step in which an average value calculation unit calculates an average value of a first level measurement result obtained by the first level measurement unit and a second level measurement result obtained by the second level measurement unit;
   a step in which a first RSSI measurement unit measures an RSSI value received through the first reception antenna;
   a step in which a second RSSI measurement unit measures an RSSI value received through the second reception antenna; and
   a step in which a correction unit corrects the average value calculated by the average value calculation unit, the correction being performed on the basis of a predetermined thermal noise level, a first RSSI value measurement result measured by the first RSSI measurement unit, and a second RSSI value measurement result measured by the second RSSI measurement unit.

* * * * *